US011431478B2

(12) United States Patent
Lan et al.

(10) Patent No.: US 11,431,478 B2
(45) Date of Patent: Aug. 30, 2022

(54) ENCRYPTION AND DECRYPTION SYSTEM, ENCRYPTION DEVICE, DECRYPTION DEVICE AND ENCRYPTION AND DECRYPTION METHOD

(71) Applicant: Nuvoton Technology Corporation, Hsinchu (TW)

(72) Inventors: Yung-Chi Lan, Taichung (TW); Cheng-Chih Wang, Jhubei (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 209 days.

(21) Appl. No.: 16/703,010

(22) Filed: Dec. 4, 2019

(65) Prior Publication Data

US 2020/0186330 A1    Jun. 11, 2020

(30) Foreign Application Priority Data

Dec. 6, 2018   (TW) .................................. 107143838

(51) Int. Cl.
*H04L 9/06*   (2006.01)
*H04L 9/08*   (2006.01)

(52) U.S. Cl.
CPC .......... *H04L 9/0656* (2013.01); *H04L 9/0827* (2013.01)

(58) Field of Classification Search
CPC ... H04L 9/12; H04L 9/30; H04L 29/06; H04L 9/18; H04L 9/32; H04L 9/06; H04L 9/08; H04L 9/0827; H04L 9/003; H04L 9/0662; H04L 9/0656; H04L 9/0891; G06F 21/00; G06F 15/16; G06F 21/6218; G06F 21/78

USPC ............................................................ 380/28
See application file for complete search history.

(56) References Cited

U.S. PATENT DOCUMENTS

| 5,799,088 | A  | * | 8/1998 | Raike | H04L 9/3093 380/46 |
| 7,120,696 | B1 | * | 10/2006 | Au | H04L 9/12 709/229 |
| 7,177,424 | B1 | * | 2/2007 | Furuya | H04L 9/0618 380/42 |
| 7,240,218 | B2 | * | 7/2007 | Kean | G06F 12/1408 711/E12.092 |

(Continued)

OTHER PUBLICATIONS

William Michael Raike, WO1995015633A1, 1999, Google Translated from French. (Year: 1999).*

*Primary Examiner* — Samson B Lemma
(74) *Attorney, Agent, or Firm* — Muncy, Geissler, Olds & Lowe, P.C.

(57) ABSTRACT

An encryption and decryption system includes a first electronic device and a second electronic device. The first electronic device includes a memory device and an encryption device. The memory device can store plaintext data. The encryption device can generate first pseudo data and first pseudo key. The encryption device encrypts first pseudo data by the first pseudo key and encrypt the plaintext data by a key, and outputs the ciphertext data generated by encrypting plaintext data by the key. The second electronic device includes a decryption device for generating second pseudo data and the second pseudo key. The decryption device decrypts the second pseudo data by the second pseudo key, and decrypts the ciphertext data by the key, and outputs the plaintext data, which is generated by decrypting the ciphertext data by the key.

5 Claims, 6 Drawing Sheets

(56) References Cited

U.S. PATENT DOCUMENTS

| | | | |
|---|---|---|---|
| 10,187,200 B1* | 1/2019 | Firestone | H04L 9/14 |
| 2002/0085710 A1* | 7/2002 | Ananth | H04L 9/065 |
| | | | 380/37 |
| 2003/0226025 A1* | 12/2003 | Lin | G06F 21/6218 |
| | | | 713/193 |
| 2008/0069341 A1* | 3/2008 | Relyea | H04L 9/0822 |
| | | | 380/30 |
| 2013/0227269 A1* | 8/2013 | Ting | G06F 21/45 |
| | | | 713/100 |
| 2018/0054301 A1* | 2/2018 | El-Alfy | H04L 9/0662 |

\* cited by examiner

ENCRYPTION AND DECRYPTION SYSTEM, ENCRYPTION DEVICE, DECRYPTION DEVICE AND ENCRYPTION AND DECRYPTION METHOD

CROSS-REFERENCE TO RELATED APPLICATION

This application claims the benefit of Taiwan Patent Application No. 107143838, filed on Dec. 6, 2018, in the Taiwan Intellectual Property Office, the disclosure of which is incorporated herein in its entirety by reference.

BACKGROUND OF THE INVENTION

1. Field of the Invention

The present invention relates to an encryption and decryption technology, more particularly to an encryption and decryption technology using pseudo data and pseudo key, which are generated randomly, to perform pseudo decryption on data.

2. Description of the Related Art

With the advancement of technology, the security of data transmission between electronic devices becomes more and more important, so that encryption and decryption technology is usually performed on the data transmission between electronic devices to protect the security of the transmitted data.

In the conventional data encryption and decryption process, when an electronic device (A) wants to transmit data to an electronic device (B), in order to prevent the hacker from interpreting transmission signals to obtain the data (such as plaintext) transmitted from the electronic device A to the electronic device B, the electronic device A first encrypts the to-be-transmitted data by using the encryption algorithm, and after receiving the encrypted data (such as ciphertext), the electronic device B decrypts the encrypted data to obtain the original data.

In recent years, hackers usually perform differential power analysis (DPA) attacks to derive the keys used for encryption and decryption. In order to perform the DPA attack, the hacker inputs multiple sets of plaintexts to activate an internal encryption circuit of a chip to generate multiple sets of ciphertext, and the hacker can record power traces of the chip during the encryption process, so as to use the relationship between multiple sets of plaintexts and ciphertext and the power traces to calculate the possible key. Since the encryption and decryption algorithm is public, after the hacker obtains the key, the hacker can decrypt the data, which is to be transmitted from the electronic device (A) to the electronic device (B). Therefore, how to avoid the hackers from using differential energy analysis attacks to obtain the key used for encryption and decryption and from stealing data transmitted between electronic devices is an important issue in the industry.

SUMMARY OF THE INVENTION

In order to solve the convention problems, the present invention provides an encryption and decryption technology. Particularly, present invention provides an encryption and decryption system using pseudo data and a pseudo key, which are generated randomly, to perform pseudo decryption on data, and an encryption device thereof, a decryption device thereof, and an encryption and decryption method thereof.

According to an embodiment, the present invention provides an encryption and decryption system comprising a first electronic device and a second electronic device. The first electronic device includes a first memory device and a first encryption device. The first memory device is configured to store plaintext data. The first encryption device is configured to generate first pseudo data, generate at least one first pseudo key, and encrypt the plaintext data by a key and encrypt the first pseudo data by the first pseudo key, and output ciphertext data generated by encrypting the plaintext data by the key. The second electronic device is configured to receive the ciphertext data from the first electronic device, and the second electronic device includes a first decryption device configured to generate second pseudo data and at least one second pseudo key, and decrypt the ciphertext data by the key and decrypt the second pseudo data by the at least one second pseudo key, and output the plaintext data generated by decrypting the ciphertext data by the key.

According to an embodiment, the present invention provides an encryption device including a random data generator, a random key generator, and an encryption circuit. The random data generator is configured to generate pseudo data. The random key generator is configured to generate at least one pseudo key. The encryption circuit is coupled to the random data generator and the random key generator, and configured to encrypt the plaintext data by the key and encrypt the pseudo data by the first pseudo key, and output the ciphertext data generated by encrypting the plaintext data by the key.

According to an embodiment, the present invention provides a decryption device including a random data generator, a random key generator and a decryption circuit. The random data generator is configured to generate pseudo data. The random key generator is configured to generate at least one pseudo key. The decryption circuit is configured to decrypt ciphertext data by a key, and decrypt the pseudo data by the at least one pseudo key, and output plaintext data generated by decrypting the ciphertext data by the key.

According to an embodiment, the present invention provides an encryption and decryption method applicable an encryption and decryption system. The method includes following steps: generating first pseudo data, by a first electronic device; generate at least one first pseudo key, by the first electronic device; by the first electronic device, encrypting plaintext data by a key and encrypting the first pseudo data by the at least one first pseudo key; by the first electronic device, outputting ciphertext data generated by encrypting the plaintext data by the key, to a second electronic device; generating second pseudo data, by the second electronic device; generating at least one second pseudo key, by the second electronic device; and by the second electronic device, decrypting the ciphertext data by the key and decrypting the second pseudo data by the at least one second pseudo key, to obtain plaintext data generated by decrypting the ciphertext data by the key.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be acknowledged to imply the inclusion of stated elements but not the exclusion of any other elements.

Figure 1:
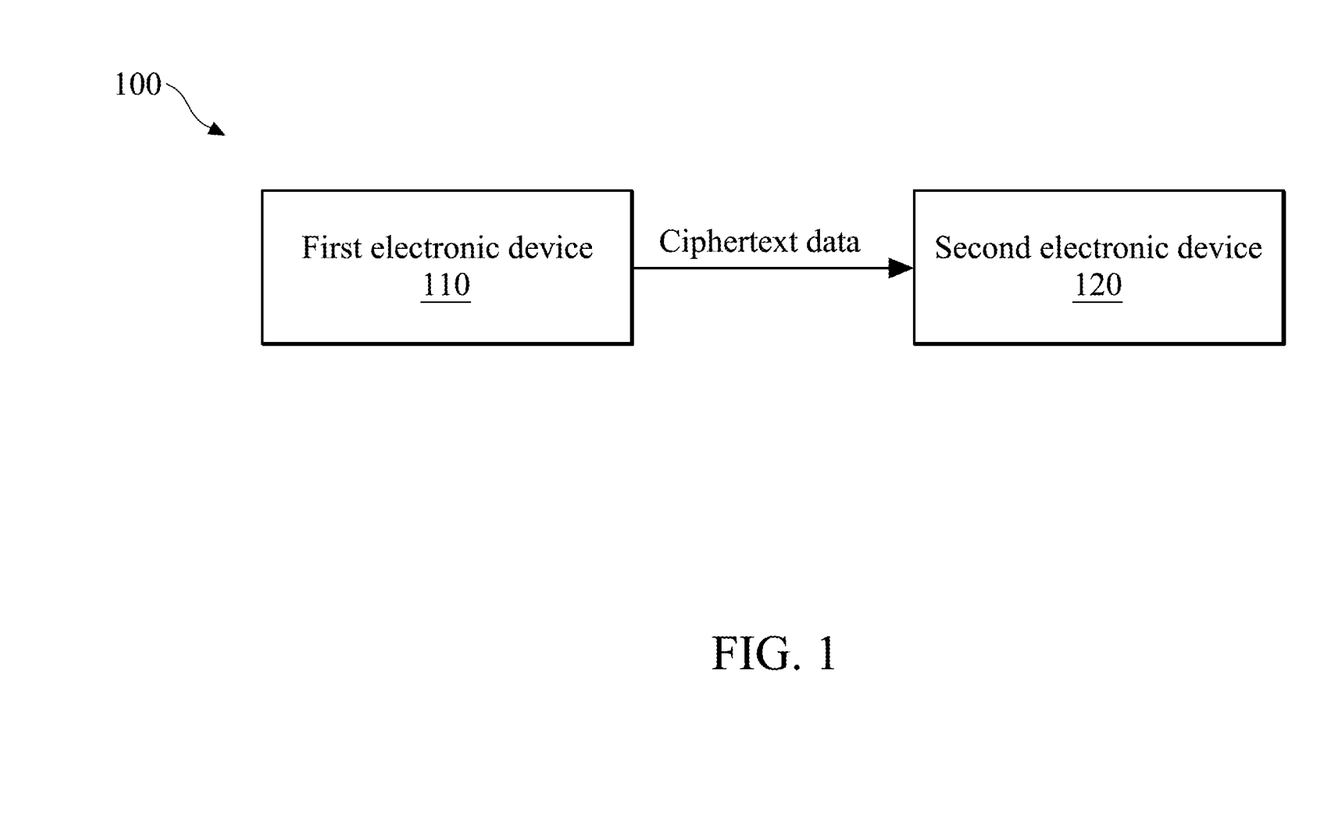
FIG. 1 is a block diagram of an encryption and decryption system 100, according to an embodiment of the invention.

Please refer to FIG. 1, which is a block diagram of an encryption and decryption system 100 according to an embodiment of the invention. As shown in FIG. 1, the encryption and decryption system 100 can include a first electronic device 110 and a second electronic device 120. It should be noted that the first electronic device can be regarded as an encryption end and the second electronic device can be regarded as a decryption end when data is transmitted from the first electronic device to the second electronic device; alternatively, the second electronic device can be regarded as an encryption end and the first electronic device can be regarded as a decryption end when the data is transmitted from the second electronic device to the first electronic device. For illustration of this embodiment of the present invention, the first electronic device is regarded as the encryption end and the second electronic device is regarded as the decryption end; however, the present invention is not limited thereto.

Figure 2:
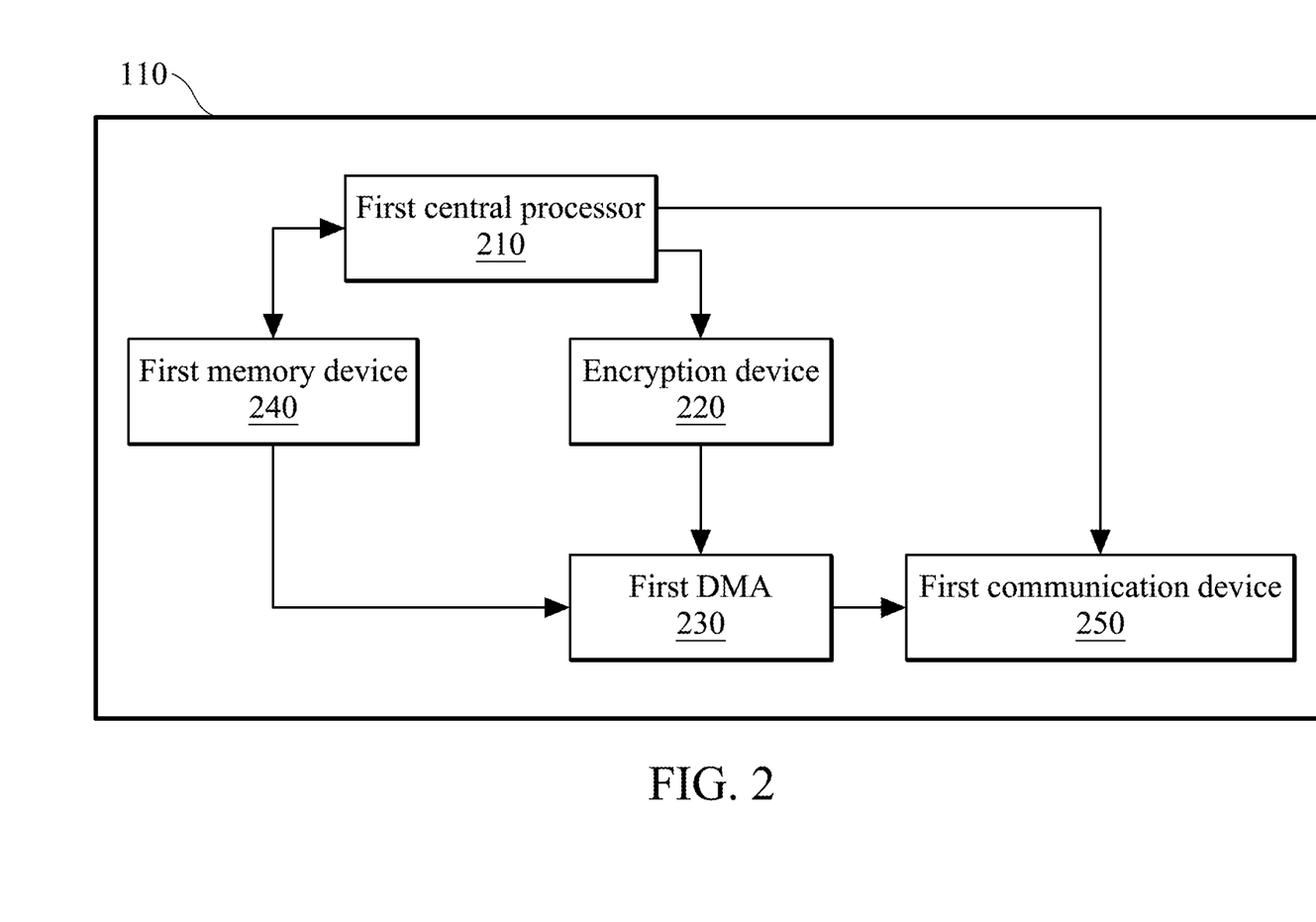
FIG. 2 is a block diagram of a first electronic device 110, according to an embodiment of the invention.

Please refer to FIG. 2, which is a block diagram of the first electronic device 110 according to an embodiment of the invention. As shown in FIG. 2, the first electronic device 110 can include a first central processor 210, an encryption device 220, a first direct memory access (DMA) 230, a first memory device 240 and a first communication device 250. It should be noted that the block diagram of FIG. 2 is merely for convenience in explanation of the embodiment of the present invention, but the present invention is not limited thereto; for example, the first electronic device 110 can include other component. Furthermore, according to an embodiment of the present invention, the first central processor 210, the encryption device 220, the first DMA 230, the first memory device 240 and the first communication device 250 can be integrated in a microcontroller (MCU). It should be noted that the first electronic device 110 can also include a decryption device, which is not shown in FIG. 2. According to an embodiment of the present invention, the decryption device of the first electronic device 110 and the encryption device 220 can be integrated in the same circuit. According to another embodiment of the present invention, the decryption device of the first electronic device 110 and the encryption device 220 can be implemented by two independent circuits. The architecture of the decryption device of the first electronic device 110 can also refer to that of the decryption device 320 shown in FIG. 5.

Figure 3:
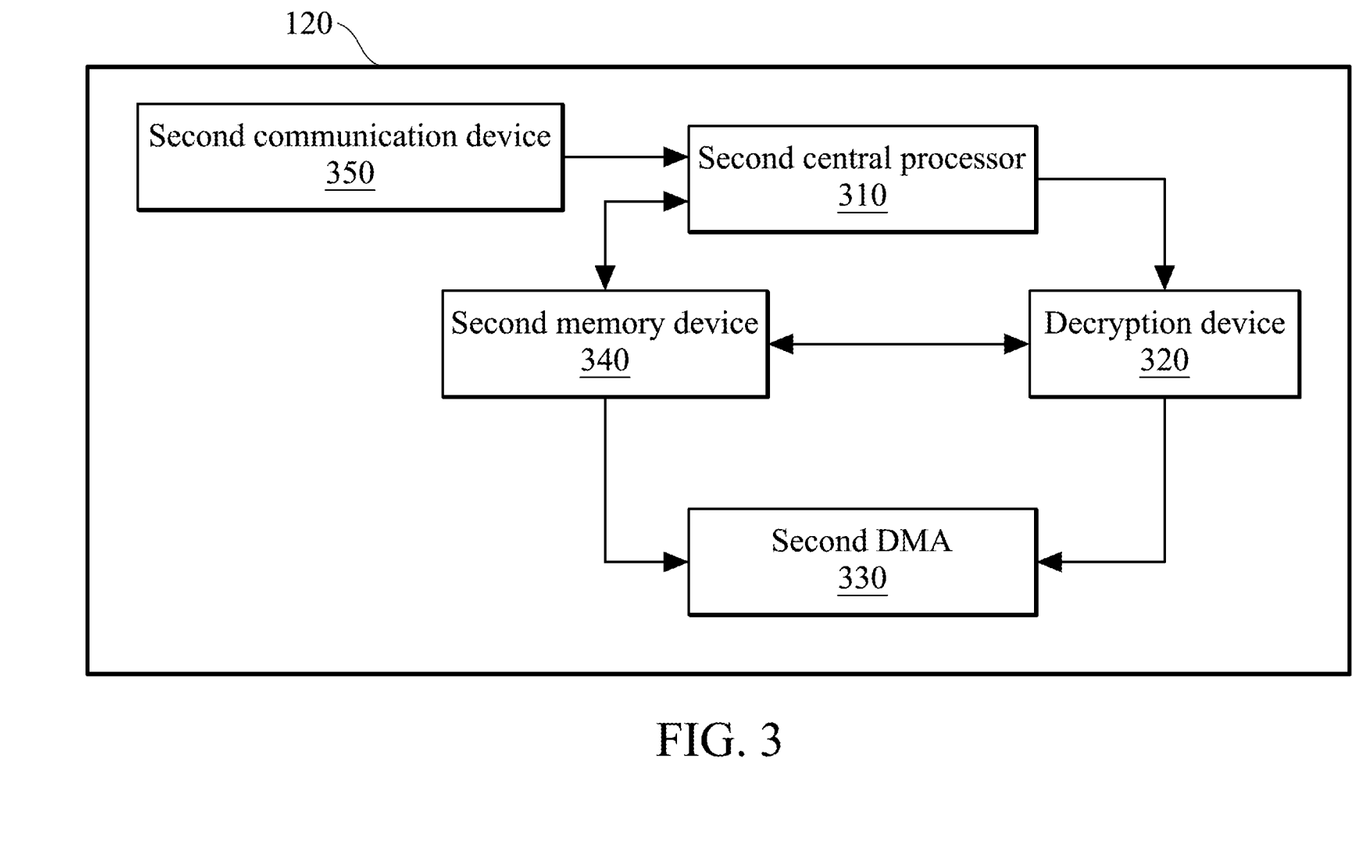
FIG. 3 is a block diagram of a second electronic device 120, according to an embodiment of the invention.

Please refer to FIG. 3, which is a block diagram of the second electronic device 120 according to an embodiment of the invention. As shown in FIG. 3, the second electronic device 120 can include a second central processor 310, a decryption device 320, a second DMA 330, a second memory device 340 and a second communication device 350. It should be noted that the block diagram of FIG. 3 is merely for convenience in explanation of the embodiment of the present invention, but the present invention is not limited thereto; for example, the second electronic device 120 can include other component. Furthermore, according to an embodiment of the present invention, the second central processor 310, the decryption device 320, the second DMA 330 and the second memory device 340 can be integrated in a microcontroller. It should be noted that the second electronic device 120 can also include an encryption device, which is not shown in FIG. 4. According to an embodiment of the present invention, the encryption device of the second electronic device 120 and the decryption device 320 can be integrated in the same circuit. According to another embodiment of the present invention, the encryption device of the second electronic device 120 and the decryption device 320 can be implemented by two independent circuits, respectively. The architecture of the encryption device of the second electronic device 120, can also refer to the encryption device 220 shown in FIG. 4.

According to an embodiment, in order to transmit plaintext data P1 from the first electronic device 110 to the second electronic device 120, the first central processor 210 informs the encryption device 220 of a memory address of the plaintext data P1 to be transmitted and a memory address for storing ciphertext data C1. Next, the encryption device 220 triggers the first DMA 230 and informs the first DMA 230 of the memory address of the plaintext data P1 to be transmitted and the memory address of the output data. After the first DMA 230 is triggered, the first DMA 230 instructs the first memory device 240 to transmit the plaintext data P1 to the encryption device 220, according to the memory address of the plaintext data P1 to be transmitted. After the encryption device 220 encrypts the plaintext data P1, the encryption device 220 stores the generated ciphertext data C1 to the first memory device 240 according to the memory address for storing the ciphertext data C1. The first DMA 230 can read the ciphertext data C1 from the first memory device 240 according to the memory address for storing the ciphertext data C1, and the first communication device 250 can transmit the ciphertext data C1 to the second communication device 350 of the second electronic device 120. The encryption device 220 can use an encryption algorithm to perform encryption operation. In an embodiment, the encryption algorithm can be a symmetric encryption algorithm, such as an advanced encryption standard (AES) algorithm, but the present invention is not limited thereto. Furthermore, the details of the process of the encryption device 220 encrypting the plaintext data P1 will be illustrated with reference to FIG. 4.

According to another embodiment of the present invention, the first central processor 210 can directly instruct the first memory device 240 to transmit the plaintext data P1 to the encryption device 220, and the first central processor 210 can directly read the ciphertext data C1 from the first memory device 240, and the first communication device 250 can transmit the ciphertext data C1 to the second communication device 350 of the second electronic device 120.

Figure 4:
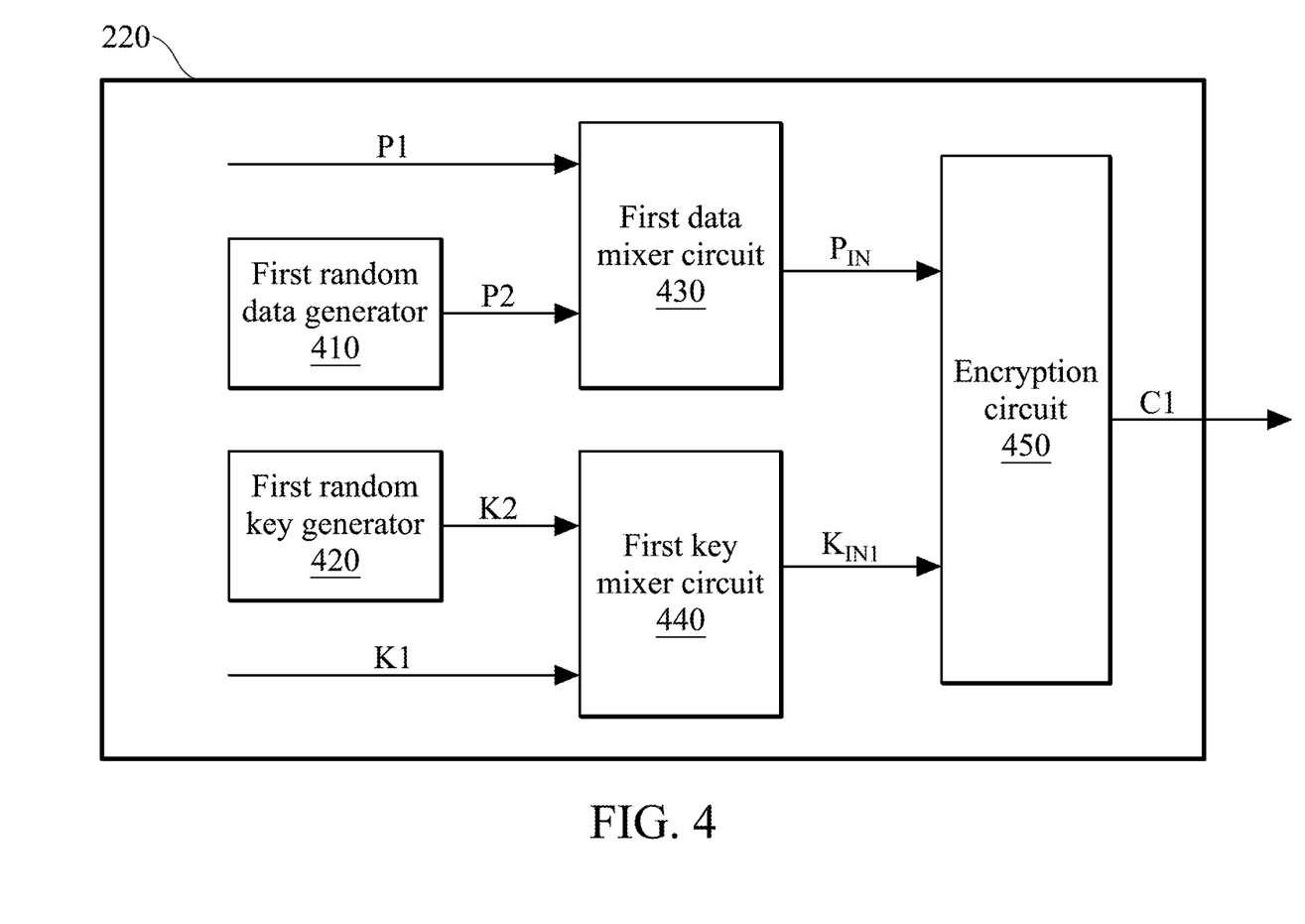
FIG. 4 is a block diagram of an encryption device 220, according to an embodiment of the invention.

Please refer to FIG. 4, which is a block diagram of an encryption device 220 according to an embodiment of the invention. As shown in FIG. 4, the encryption device 220 can include a first random data generator 410, a first random key generator 420, a first data mixer circuit 430, a first key mixer circuit 440 and an encryption circuit 450.

As shown in FIG. 4, the first data mixer circuit 430 of the encryption device 220 can obtain the plaintext data P1 from the first memory device 240, and the first key mixer circuit 440 of the encryption device 220 can obtain the key K1 for encrypting the plaintext data P1. In an embodiment, the key K1 can be pre-stored in a temporary storage device of the encryption device 220 (not shown in FIG. 4) or the first memory device 240.

After the encryption device 220 receives the plaintext data P1, the first random data generator 410 generates pseudo data P2. The pseudo data P2 contains at least one piece of sub pseudo data. According to an embodiment of the present invention, the length of each piece of sub pseudo data of the pseudo data P2 is the same that of the plaintext data P1, but the present invention is not limited thereto. The pseudo data P2 is also transmitted to the first data mixer circuit 430. After the first data mixer circuit 430 receives the plaintext data P1 and the pseudo data P2, the first data mixer circuit 430 randomly arranges the plaintext data P1 and the pieces of the sub-data of and the pseudo data P2, to generate first input data $P_{IN}$. The first data mixer circuit 430 can transmit the generated first input data $P_{IN}$ and the sequence information of the plaintext data P1 and the pseudo data P2 arranged in the first input data $P_{IN}$, to the encryption circuit 450.

Furthermore, after the encryption device 220 receives the plaintext data P1, the first random key generator 420 can generate a pseudo key K2. The pseudo key K2 contains at least one sub pseudo key. According to an embodiment of the present invention, each sub pseudo key corresponds to a piece of the sub pseudo data. According to another embodiment of the present invention, the plurality of pieces of sub pseudo data can share the same sub pseudo key. The generated pseudo key K2 is transmitted to the first key mixer circuit 440. After the first key mixer circuit 440 receives the key K1 and the pseudo key K2, the first key mixer circuit 440 can mix the key K1 and the pseudo key K2 to generate a first input key $K_{IN1}$. The first key mixer circuit 440 transmits the generated first input data $P_{IN}$ and the sequence information of the key K1 and the pseudo key K2 arranged in the first input key $K_{IN1}$, to the encryption circuit 450.

After the encryption circuit 450 receives the first input data $P_{IN}$, the sequence information of the plaintext data P1 and the pseudo data P2 arranged in the first input data $P_{IN}$, the first input key $K_{IN1}$, and the sequence information of the key K1 and the pseudo key K2 arranged in the first input key $K_{IN1}$, the encryption circuit 450 can use the key K1 to encrypt the plaintext data P1 and use the pseudo key K2 to encrypt the pseudo data P2, according to the sequence information of the plaintext data P1 and the pseudo data P2 arranged in the first input data $P_{IN}$, and the sequence information of the key K1 and the pseudo key K2 arranged in the first input key $K_{IN1}$. After the plaintext data P1 and the pseudo data P2 are encrypted completely, the encryption circuit 450 outputs the ciphertext data C1, which is generated by encrypting the plaintext data P1 by the key K1, to the first memory device 240. Next, according to the memory address of the output data, the first DMA 230 can read the ciphertext data C1 from the first memory device 240, and the first communication device 250 can transmit the ciphertext data C1 to the second communication device 350 of the second electronic device 120.

After the second communication device 350 of the second electronic device 120 receives the ciphertext data C1, the second central processor 210 informs the decryption device 320 of the memory address of storing the ciphertext data. C1 and the memory address for storing the decrypted plaintext data P1. Next, the decryption device 320 triggers the second DMA 330, and informs the second DMA 330 of the memory address of the ciphertext data C1 to be decrypted and the memory address for storing the decrypted plaintext data P1. After the second DMA 330 is triggered, the second DMA 330 can instruct the second memory device 340 to transmit the ciphertext data C1 to the decryption device 320 according to the memory address of the ciphertext data C1 to be decrypted. After the decryption device 320 decrypts the ciphertext data C1 completely, the decryption device 320 can store the plaintext data P1, which is generated by decrypting the ciphertext data C1, to the second memory device 340 according to the memory address for storing the decrypted plaintext data P1. The decryption device 320 can use a decryption algorithm to perform decryption operation. in an embodiment, the decryption algorithm can be a symmetric encryption algorithm, such as an advanced encryption standard algorithm, but the present invention is not limited thereto. The details of the process of the decryption device 320 decrypting the ciphertext data C1 will be illustrated in following paragraph with reference to FIG. 5.

Figure 5:
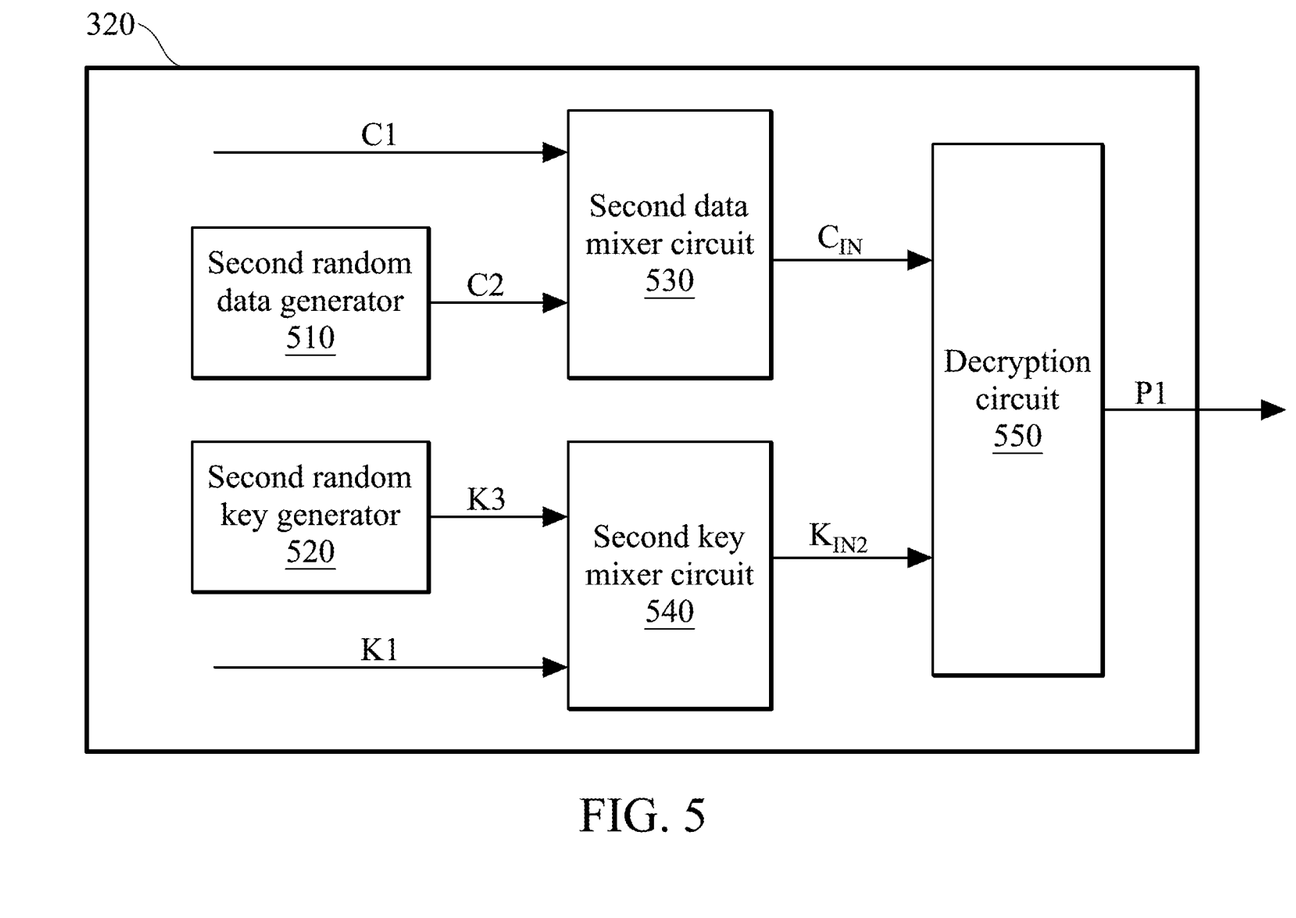
FIG. 5 is a block diagram of a decryption device 320, according to an embodiment of the invention.

FIG. 5 is a block diagram of a decryption device 320 according to an embodiment of the invention. As shown in FIG. 5, the decryption device 320 can include a second random data generator 510, a second random key generator 520, a second data mixer circuit 530, a second key mixer circuit 540 and a decryption circuit 550.

As shown FIG. 5, the second data mixer circuit 530 of the decryption device 320 can obtain the ciphertext data C1 from the second memory device 340, and the second key mixer circuit 540 of the decryption device 320 can obtain the key K1 for decrypting the ciphertext data C1. In an embodiment, the key K1 can be pre-stored in a temporary storage device (not shown in FIG. 5) of the decryption device 320 or in the second memory device 340.

After the decryption device 320 receives the ciphertext data C1, the second random data generator 510 can generate the pseudo data C2. The pseudo data C2 can contain at least one piece of sub pseudo data. According to an embodiment of the present invention, the length of each piece of the sub pseudo data of the pseudo data C2 is the same as that of the plaintext data P1, but the present invention is not limited thereto. The pseudo data C2 is also transmitted to the second data mixer circuit 530. After the second data mixer circuit 530 receives the ciphertext data C1 and the pseudo data C2, the second data mixer circuit 530 randomly arranges the ciphertext data C1 and the pieces of sub-data of and the pseudo data C2, to generate second input data $C_{IN}$. The second data mixer circuit 530 then transmits the generated second input data $C_{IN}$ and the sequence information of the ciphertext data C1 and the pseudo data C2 arranged in the second input data $C_{IN}$, to the decryption circuit 550.

Furthermore, after the decryption device 320 receives the ciphertext data C1, the second random key generator 520 generates a pseudo key K3. The pseudo key K3 can contain at least one sub pseudo key. According to an embodiment of the present invention, each sub pseudo key corresponds to a piece of sub pseudo data. According to another embodiment of the present invention, the plurality of pieces of sub pseudo data can share the same sub pseudo key. The generated pseudo key K3 is transmitted to the second key mixer circuit 540. After the second key mixer circuit 540 receives the key K1 and the pseudo key K3, the second key mixer circuit 540 mixes the key K1 and the pseudo key K3 to generate a second input key $K_{IN2}$. The first key mixer circuit 440 transmits the generated second input key $K_{IN2}$ and the sequence information of the key K1 and the pseudo key K3 arranged in the second input key $K_{IN2}$, to the decryption circuit 550.

After the decryption circuit 550 receives the second input data $C_{IN}$, the sequence information of the ciphertext data C1 and the pseudo data C2 arranged in the second input data $C_{IN}$, the second input key $K_{IN2}$, and the sequence information of the key K1 and the pseudo key K3 arranged in the second input key $K_{IN2}$, the encryption circuit 450 can use the key K1 to decrypt the ciphertext data C1 and use the pseudo key K3 to decrypt the pseudo data C2 according to the sequence information of the ciphertext data C1 and the pseudo data C2 arranged in the second input data $C_{IN}$, and the sequence information of the key K1 and the pseudo key K3 arranged in the second input key $K_{IN2}$. After decrypting the ciphertext data C1 and the pseudo data C2 completely, the decryption circuit 550 outputs the plaintext data P1, which is generated by decrypting the ciphertext data C1 by the key K1, to the second memory device 340.

Figure 6:
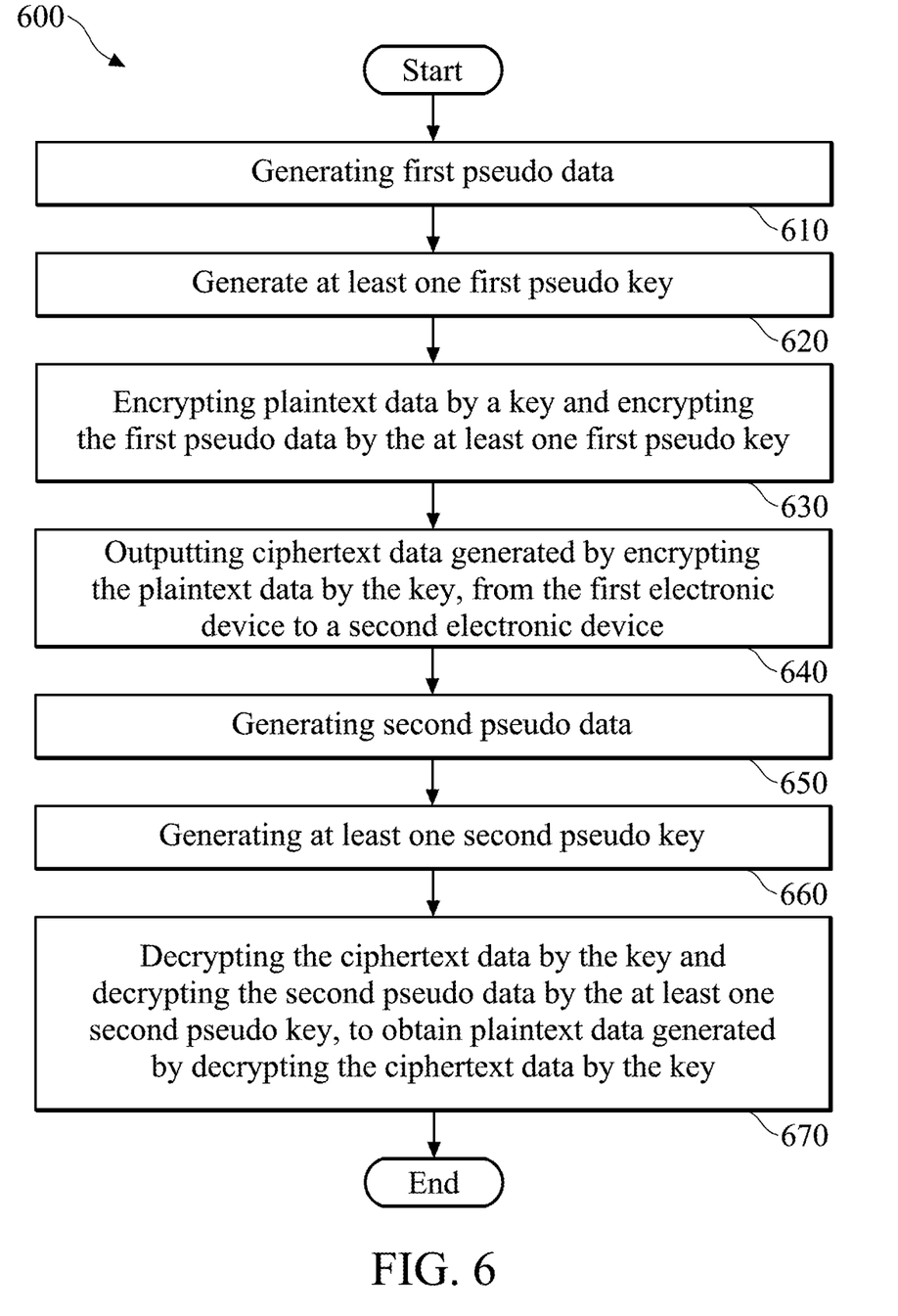
FIG. 6 is a flowchart 600 of an encryption and decryption method, according to an embodiment of the invention.

FIG. 6 is a flowchart 600 of an encryption and decryption method according to an embodiment of the invention. The encryption and decryption method can be applicable to the encryption and decryption system 100 of the present invention, and includes steps S610 to S670. In a step S610, the first electronic device of the encryption and decryption system 100 generates the at least one piece of first pseudo data. In a step S620, the first electronic device of the encryption and decryption system 100 generates the at least one first pseudo key. In a step S630, the first electronic device of the encryption and decryption system 100 encrypts the plaintext data by a key and encrypts the first pseudo data by the first pseudo key. In a step S640, the first electronic device of the encryption and decryption system 100 outputs the ciphertext data, which is generated by encrypting the plaintext data by the key, to the second electronic device of the encryption and decryption system 100. In a step S650, the second electronic device of the encryption and decryption system 100 generates the at least one piece of second pseudo data. In a step S660, the second electronic device of the encryption and decryption system 100 generates the at least one second pseudo key. In a step S670, the second electronic device of the encryption and decryption system 100 decrypts the ciphertext data by the key and decrypts the second pseudo data by the second pseudo key, so as to obtain plaintext data generated by decrypting the ciphertext data by the key.

During the encryption and decryption process of the encryption and decryption method provided in the embodiment of the present invention, the pseudo data and the pseudo key are generated to mix with the true data and the true key for further encryption and decryption process. As a result, a hacker possibly records wrong power trace and cannot calculate the possible key. According to embodiment of the present invention, the encryption and decryption method of the present invention can prevent the encryption/decryption key from being stolen by the hacker using differential energy analysis attack, so as to protect the data transmitted between electronic devices from being stolen.

The steps of method and algorithm disclosed in the specification of the present invention can be directly executed by a processor to directly apply to a hardware module, a software module or a combination thereof. A software module can include an execution command and relate data, and the software module and other data can be stored in a data memory such as RAM memory, a flash memory, a ROM memory, an erasable programmable ROM memory, an electrically erasable programmable ROM memory, a register, a hard disk, a portable hard disk, a CD-ROM, a DVD or other computer readable storage medium well known in the art. A storage medium can be coupled to a machine device such as a computer/processor, and for convenience in explanation, the processor is taken as an example of the machine device in the present disclosure, and the processor can read data (such as program codes) from and write data into the storage medium. The storage medium can be integrated with the processor. An application-specific integrated circuit (ASIC) includes the processor and the storage medium. A user device can include the application-specific integrated circuit. In other words, the processor and the storage medium can be included in the user device but not directly connected to the user device. Furthermore, in some embodiments, the product suitable for the computer program can include a readable storage medium, wherein the readable storage medium includes the codes related to at least an embodiment of the present invention. In some embodiments, the product suitable for the computer program can include package material.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. An encryption and decryption system, comprising:
  a first electronic device comprising:
   a first memory device configured to store plaintext data and a key; and a first encryption device configured to generate first pseudo data and generate at least one first pseudo key; and a second electronic device comprising:

a second memory device; and a first decryption device configured to generate second pseudo data and at least one second pseudo key, wherein the first encryption device generates a first input data according to the plaintext data and the first pseudo data, wherein the first encryption device generates a first input key according to the key and the at least one first pseudo key, wherein according to the first input data and the first input key, the first encryption device encrypts the plaintext data by the key to generate a ciphertext data and encrypts the first pseudo data by the at least one first pseudo key, wherein the first encryption device outputs the ciphertext data to the second electronic device, wherein the first decryption device generates a second input data according to the ciphertext data and the second pseudo data, wherein the first decryption device generates a second input key according to the key and the at least one second pseudo key, wherein according to the second input data and the second input key, the first decryption device decrypts the ciphertext data by the key to generate the plaintext data and decrypts the second pseudo data by the at least one second pseudo key, and wherein the first decryption device outputs the plaintext data to the second memory device.

2. The encryption and decryption system according to claim 1, wherein the first electronic device comprises a second decryption device, and the second electronic device comprises a second encryption device.

3. An encryption device, comprising:

a random data generator configured to generate pseudo data;

a random key generator configured to generate at least one pseudo key;

and an encryption circuit coupled to the random data generator;

a data mixer circuit coupled to the random data generator and the encryption circuit, and configured to mix plaintext data and the pseudo data to generate input data; and a key mixer circuit coupled to the random key generator and the encryption circuit, and configured to mix a key and the at least one pseudo key to generate an input key, wherein according to the input data and the input key, the encryption circuit encrypts the plaintext data by the key to generate a ciphertext data and encrypts the pseudo data by the at least one first pseudo key, wherein the encryption device outputs the ciphertext data; wherein the data mixer circuit transmits the input data, and first sequence information of the plaintext data and the pseudo data arranged in the input data, to the encryption circuit, and the key mixer circuit transmits the input key, and second sequence information of the key and the pseudo key arranged in the input key, to the encryption circuit and wherein the encryption circuit encrypts the plaintext data and the pseudo data according to the input data, the first sequence information of the plaintext data, the input key, and the second sequence information of the key.

4. A decryption device, comprising:

a random data generator configured to generate pseudo data;

a random key generator configured to generate at least one pseudo key; and a decryption circuit;

a data mixer circuit coupled to the random data generator and the decryption circuit, and configured to mix ciphertext data and the pseudo data to generate input data; and a key mixer circuit coupled to the random key generator and the decryption circuit, and configured to mix a key and the at least one pseudo key, to generate an input key, wherein according to the input data and the input key, the decryption circuit decrypts the ciphertext data by the key to generate plaintext data and decrypts the second pseudo data by the at least one second pseudo key, and wherein the decryption circuit outputs the plaintext data; wherein the data mixer circuit transmits the input data and first sequence information of the ciphertext data and the pseudo data arranged in the input data, to the decryption circuit, and the key mixer circuit transmits the input key and second sequence information of the key and the pseudo key arranged in the input key, to the decryption circuit and; wherein the decryption circuit decrypts the ciphertext data and the pseudo data according to the input data, the first sequence information of the ciphertext, the input key, and the second sequence information of the key.

5. An encryption and decryption method, applicable an encryption and decryption system and comprising:

generating first pseudo data, by a first electronic device;

generating at least one first pseudo key, by the first electronic device;

generating, by the first electronic device, a first input data according to plaintext data and the first pseudo data;

generating by the first electronic device a first input key according to a key and the at least one first pseudo key;

according to the first input data and the first input key, encrypting, by the first electronic device, the plaintext data by the key to generate a ciphertext data and encrypts the first pseudo data by the at least one first pseudo key;

outputting, by the first electronic device, the ciphertext data to a second electronic device;

generating second pseudo data, by the second electronic device;

generating at least one second pseudo key, by the second electronic device;

generating, by the second electronic device, a second input data according to the ciphertext data and the second pseudo data;

generating, by the second electronic device, a second input key according to the key and the at least one second pseudo key; and according to the second input data and the second input key, decrypting, by the second electronic device, the ciphertext data by the key to generate the plaintext data and decrypting the second pseudo data by the at least one second pseudo key.

* * * * *